(12) United States Patent
Stellwag

(10) Patent No.: US 8,800,803 B2
(45) Date of Patent: Aug. 12, 2014

(54) POT COVER WITH LOCKING MEANS

(76) Inventor: Jurgen Stellwag, Munich (DE)

( * ) Notice: Subject to any disclaimer, the term of this patent is extended or adjusted under 35 U.S.C. 154(b) by 134 days.

(21) Appl. No.: 13/361,179

(22) Filed: Jan. 30, 2012

(65) Prior Publication Data

US 2012/0199591 A1    Aug. 9, 2012

(30) Foreign Application Priority Data

Feb. 7, 2011 (DE) .......................... 10 2011 010 550

(51) Int. Cl.
*A47J 27/08* (2006.01)
*B65D 45/00* (2006.01)
*A47J 27/092* (2006.01)
*B65D 51/16* (2006.01)

(52) U.S. Cl.
USPC ..... 220/573.1; 220/231; 220/238; 220/203.1; 220/318; 220/212.5

(58) Field of Classification Search
USPC ........... 220/573.1, 231, 234, 238, 318, 203.1, 220/212.5, 287, 324
See application file for complete search history.

(56) References Cited

U.S. PATENT DOCUMENTS

| | | | |
|---|---|---|---|
| 2,636,635 A | 4/1953 | During, Sr. et al. | |
| 3,592,352 A * | 7/1971 | Shirae | 220/318 |
| 3,876,104 A * | 4/1975 | Minsky et al. | 220/318 |
| 4,161,260 A | 7/1979 | Lagostina | |
| 4,164,300 A * | 8/1979 | Raczynski et al. | 220/318 |
| 5,135,121 A * | 8/1992 | Javier | 220/203.07 |
| 6,450,361 B1 * | 9/2002 | Mendelson et al. | 220/573.1 |
| 6,513,420 B1 * | 2/2003 | Park | 99/337 |
| 6,824,004 B1 * | 11/2004 | Wooderson | 220/318 |
| 7,523,696 B2 * | 4/2009 | Seurat Guiochet et al. | 99/337 |
| 7,775,390 B2 * | 8/2010 | de Bastos Reis Portugal et al. | 220/321 |
| 8,297,467 B2 * | 10/2012 | Zhong et al. | 220/573.1 |
| 2013/0104875 A1 | 5/2013 | Schultz et al. | |

FOREIGN PATENT DOCUMENTS

WO    2009098222    8/2009

OTHER PUBLICATIONS

Office Action for DE10 2011 010 550.6 with English Translation.

* cited by examiner

*Primary Examiner* — Mickey Yu
*Assistant Examiner* — Niki Eloshway
(74) *Attorney, Agent, or Firm* — Simmons Perrine Moyer Bergman, PLC

(57) ABSTRACT

The invention relates to a combination of cover (2) and pot (5) can be used as a pressure cooker with a slight overpressure. A first annular sealing element (26) is provided at the bottom side of the cover (2) and comprises at least one locking means (10a, 10b) to match the size of the pot (5). The locking means (10a, 10b) comprises a contour portion (12), an actuating means (24) and an adjustment device with a second sealing element (16), wherein the second sealing element (16) is slidably movable in and against the center of the cover (2). A form-locking and force-locking connection is formed between the cover (2) and an upper portion of the outer surface of the pot (5) by the second sealing element (16) of the at least one locking means (10a, 10b).

13 Claims, 11 Drawing Sheets

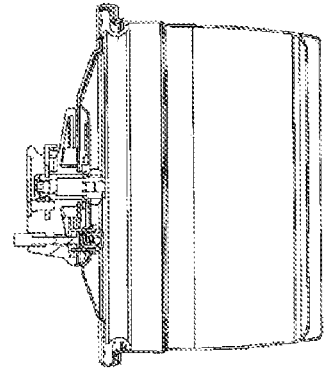
Fig. 1B
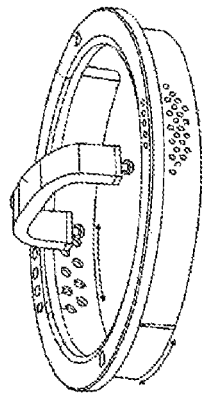
Fig. 1C
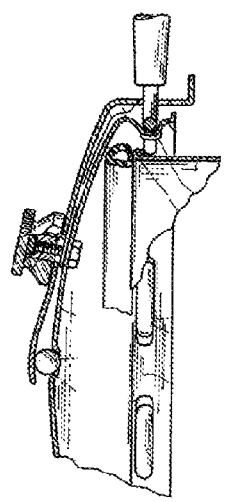
Fig. 1A
Fig. 1
(Prior Art)

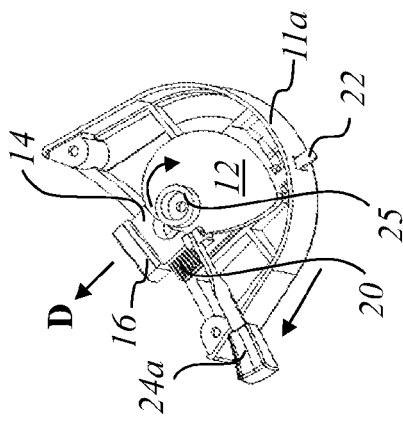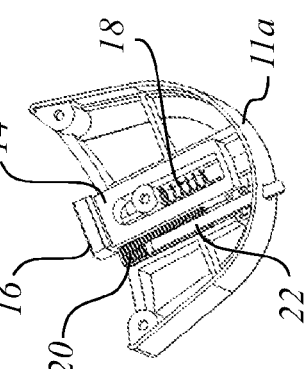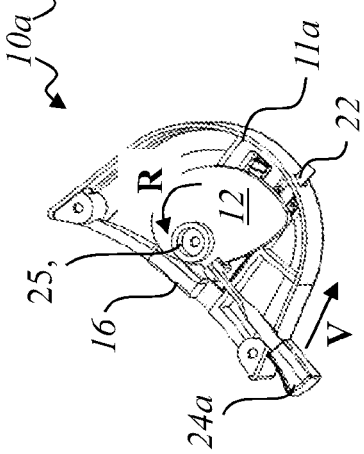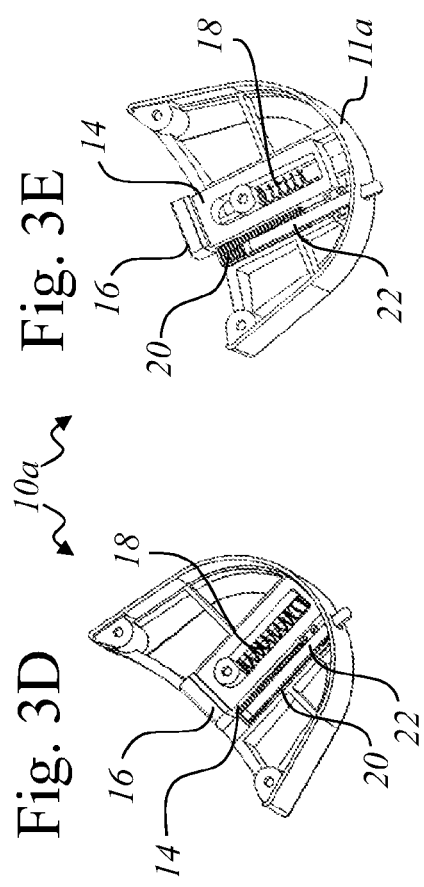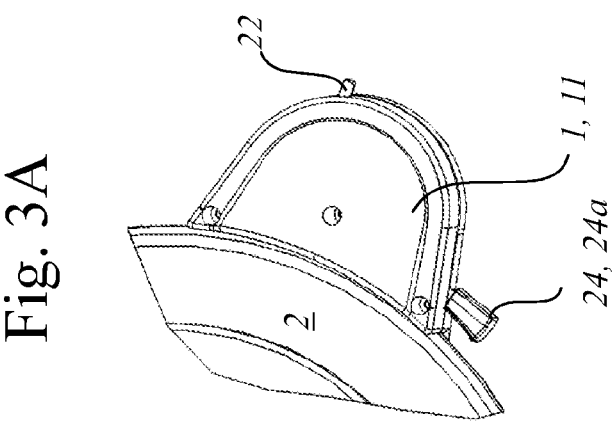

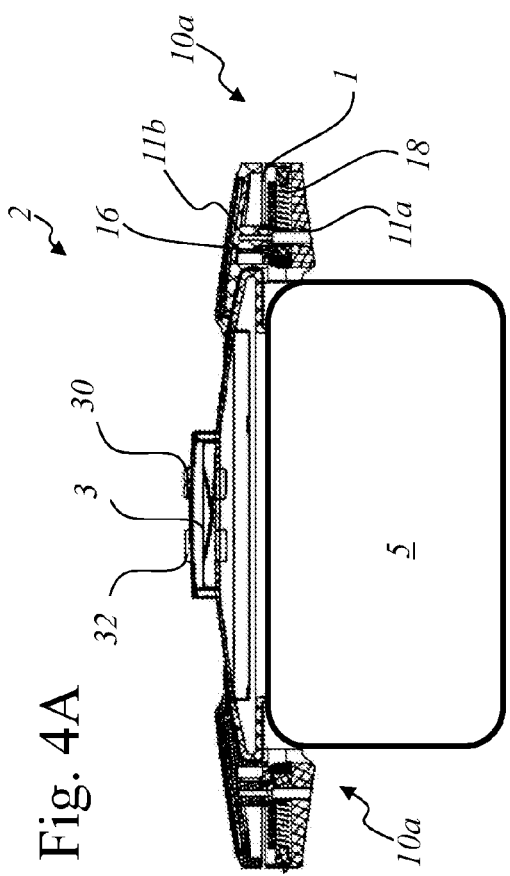
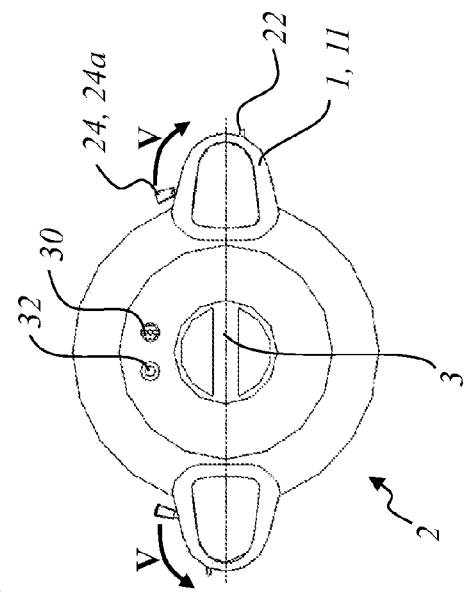
Fig. 4A
Fig. 4B

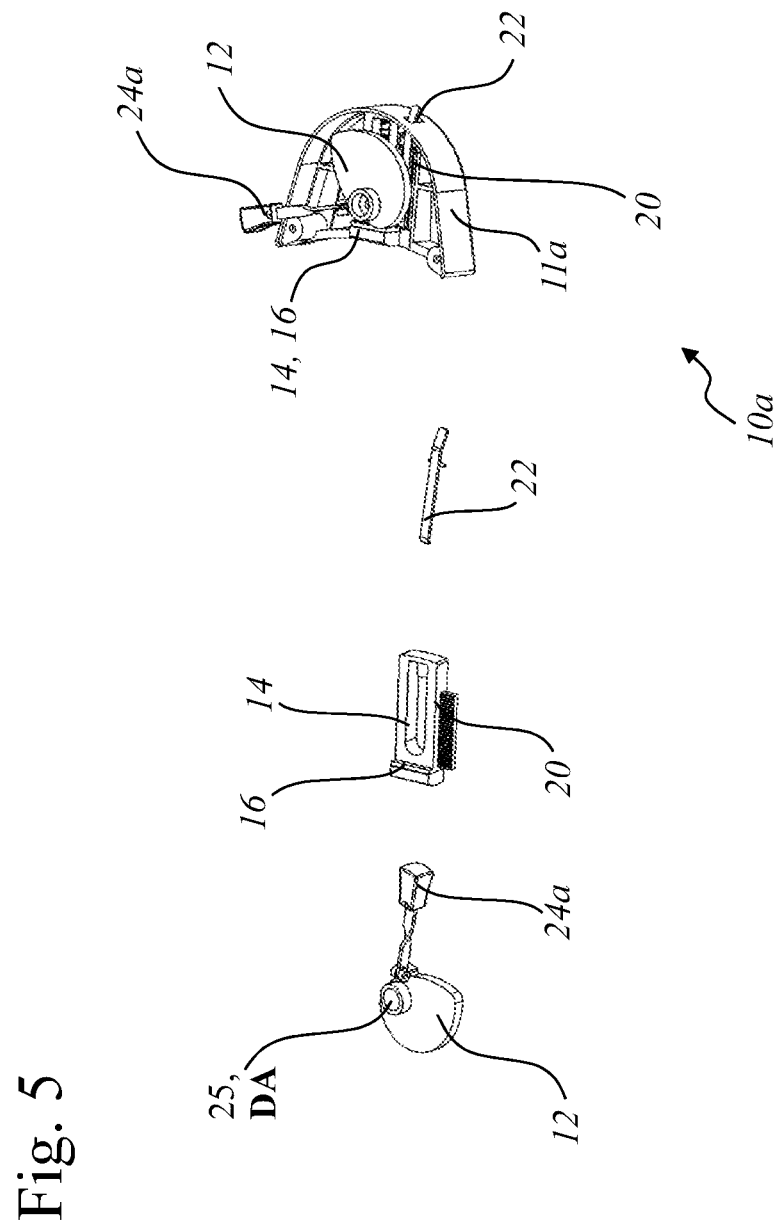

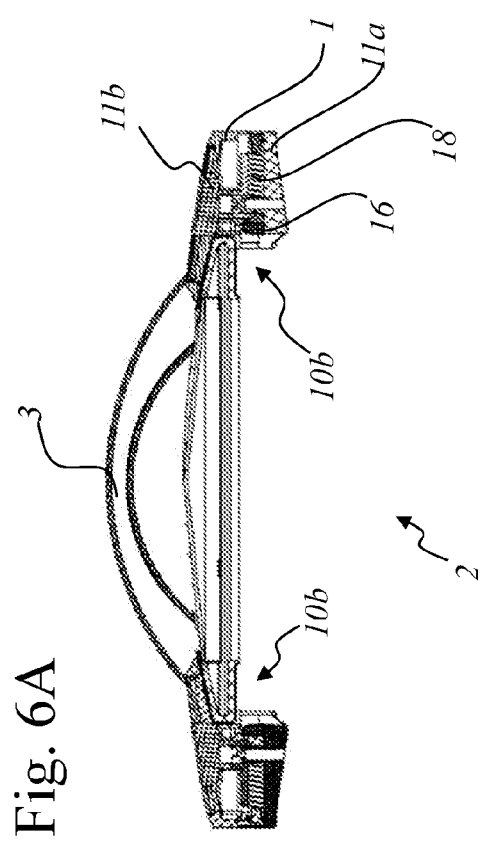
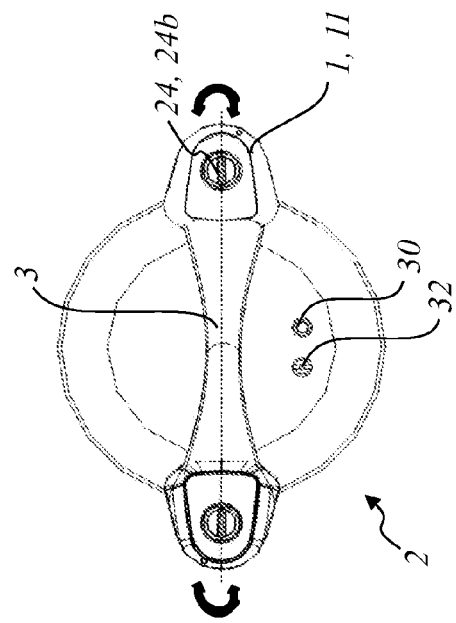
Fig. 6A
Fig. 6B

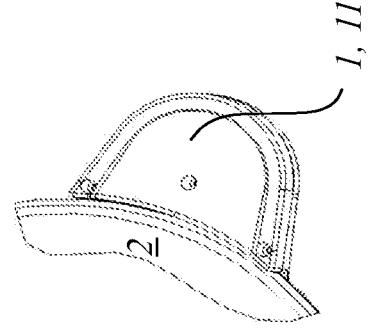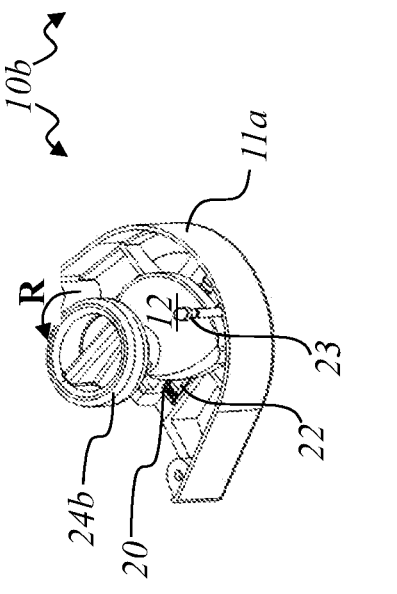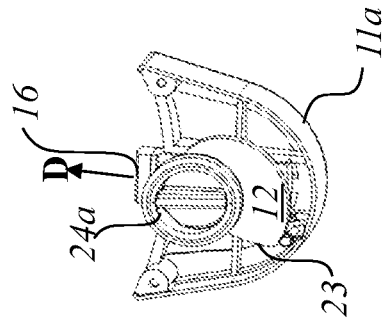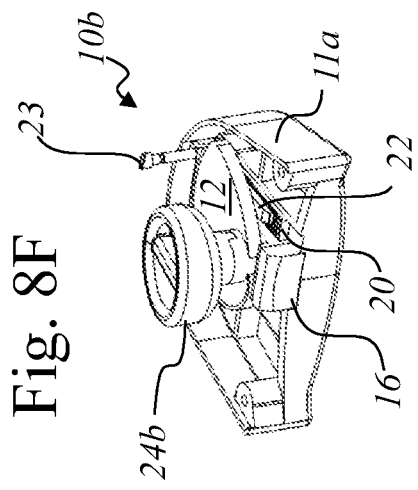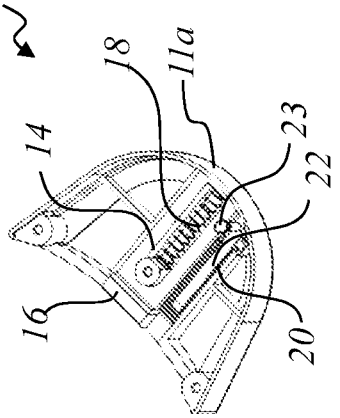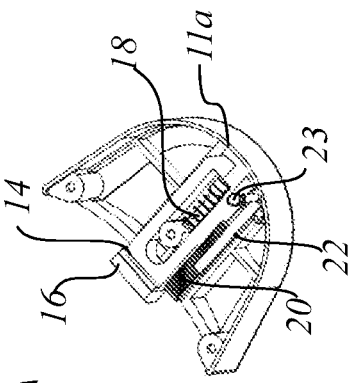

POT COVER WITH LOCKING MEANS

CLAIM OF PRIORITY

The present application claims priority to German Application DE 10 2011 010 550.6, filed on Feb. 7, 2011.

FIELD OF INVENTION

The present invention relates to pot cover with a locking means for use with a pot according to the characteristics of the preamble of claim 1.

BACKGROUND

The pressure cooker has established itself for many years in many households as an important cooking tool, because it clearly shortens the cooking time of many dishes. It saves energy costs and preserves the vitamins in the food. The pressure cooker is usually a special thick-walled pot. The upper edge is bent outwards and comprises bayonet-like recesses for receiving the pot cover, whereby a pressure-resistant connection is formed. The cover is specially shaped. The cover comprises a rubber ring gasket and usually a control valve as well as a safety valve to limit the pressure. The valves of modern pressure cookers are firmly integrated into the cover. The working valve usually uses a pin with ring markings as a pressure gauge, whereby the pin rises with rising pressure. Nowadays the valve is coupled to the locking means of the cover. To prevent accidents, the pressure cooker can only be opened after the pressure has been released. A tightly screwed cover with a safety valve closes the pot tightly.

By heating the interior of the pot to a temperature of more than 100 degrees Celsius, an excess pressure of about 1 bar can be achieved. Thereby the cooking time of most foods is significantly shortened.

DE 2832608 shows a cover for cooking pots or the like. The cover can only be used with pots or containers that show an outwardly flanged edge. With this cover it is possible to close this kind of pots or containers tightly, so that they can be used for a steam cooking method (FIG. 1A).

DE202010012194U1 describes a cover for a pressure cooker comprising a frame cover with a gasket and a handle. The cover can be locked to a special pot. The cover comprises a handle, which can be removed from the frame cover together with at least a part of the locking means (FIG. 1B).

DE 102008008311 shows a cover with an elastic ring element. The cover comprises openings for the pouring of liquids. Therefore a pressure build up is not possible and the cover cannot be used as pressure cooker (FIG. 1C).

FIG. 2 represents the pressure ratios achieved or used during cooking. The numbers correspond to the extra pressure that is built up in the respective pots. Number A shows the pressure ratios in low pressure cookers of type I, whereby only a low additional pressure is build up. In this case a pressure of up to 5 kPa over the standard pressure is built up. This additional pressure does not need to be released before the cover can be opened. In particular, up to an additional pressure of about 2 kPa the cover can be opened safely. Number B shows the pressure ratios in low pressure cookers of type II, whereby an additional pressure of about 35 kPa to 55 kPA is build up. This pressure has to be release before a type II pressure cooker can be opened. Number C shows the pressure ratios in high pressure cookers. The American standard high pressure cooker usually uses an additional pressure of about 107 kPa. Therefore a pressure of about 2 bar prevails in these pots.

A particular disadvantage of the known devices is, in particular, that these generally consist of a combination of a pot with a matching cover. Alternatively the cover can only be used with pots of almost the same diameter and with a similar shape of the upper edge.

The object of the invention is to provide a universal cover, which is adaptable to various pot sizes. The cover should furthermore be suitable for use as a low pressure cooker in combination almost any pot.

The above object is achieved by a pot cover with the features described in patent claim 1. Further advantageous embodiments are described by the dependent claims.

DESCRIPTION

The invention relates to a pot cover for a cooking pot. The cover can be used in combination with various pots, whereby low-pressure cooking is possible. The cover comprises at least one release valve for releasing steam, comparable to the known covers that are usually used in combination with special tailored pots.

According to the invention, the cover can be used with pots of different size and different design or shape of the upper pot edge. For this purpose the bottom side of the cover is provided with a first annular sealing element. The cover furthermore comprises at least one locking means to adapt to the size and/or the shape of the pot. In particular, a form-fitting or positive and force-fitting or non-positive connection can be produced between the cover and the pot with the help of at least one locking means and the first annular sealing element. The locking means especially comprises a contour portion, an actuating means and an adjustment means, which are operatively connected to each other.

The adjustment means includes a second sealing element, which can be moved towards the center of the cover or away from the center of the cover. The adjustment means can be adjusted via the actuating means, whereby the second sealing element of the adjustment means is pressed against the pot. Especially the second sealing element is pressed against an upper area of the outer surface of the pot. In combination with the first annular sealing element on the bottom side of the cover, a form-fitting or positive and force-fitting or non-positive connection is produced between the cover and the upper edge of the pot.

The contour portion is rotatably mounted on the actuating means via a shaft. In an initial position the adjustment means rests on the contour portion. The cover is placed on the pot. Pots of different diameter can be used, whereby the upper diameter of the pot has to be at least slightly smaller than the outermost diameter of the cover. A rotation of the contour portion is caused by an activation of the actuating means. The contour portion preferably has a teardrop-shaped or the like. The pivot point, i.e. the mounting or attachment of the actuating means on the contour portion via the shaft, is preferably arranged peripherally or decentralized.

By the movement or rotation of the contour portion, the adjustment means is moved along the contour. Thereby the adjustment means is moved towards the center of cover, until the second sealing element, which is assigned to the adjustment means, firmly rests against the pot. With the second elastic sealing element of the adjustment means and the first annular sealing element at the bottom side of the cover, a form-fitting or positive and force-fitting or non-positive connection between the pot and the cover is established.

According to a preferred embodiment, the actuating means automatically returns to its initial position, meanwhile a return movement of the adjustment means is prevented. According to an alternative embodiment, the actuating means remains in the set position or is manually set back to the initial position by the user.

The actuating means is preferably an actuating bolt or a rotary knob. The adjustment means comprises a sliding element with sealing element. The second sealing element can especially be formed as a sealing lip made of a thermo-elastic plastic. The adjustment means furthermore comprises a blocking means with a return element. In particular, the blocking means is formed by a toothed rack and a pinion rod. The toothed rack and the pinion rod interlock, thereby preventing an unintended rearward or return movement of the sliding element.

In order to remove the cover from the pot, the blocking means have to be unlocked. This is done particularly by releasing the interlocking between the toothed rack and the pinion rod, especially via a releasing means. After the interlocking between the toothed rack and the pinion rod has been released, the adjustment means is moved back into its initial position with the help of a return element. In this position the adjustment means rests on the contour portion again.

Preferably, the locking means is disposed in a housing, which can serve as holding element for the cover or as holding element for the combination of pot and locked cover. According to a preferred embodiment two holding elements are arranged on opposite sides of the cover. Both holding elements each comprise a locking means. The locking means are preferably arranged symmetrically as mirror images. Thereby the actuating means of the two locking means can be operated simultaneously, thus triggering a largely analog or uniform motion of the adjustment means in the direction of the center of the cover. The pot is thus sandwiched on two sides by the adjustment means provided by the cover. The second sealing elements of the adjustment means and the first annular sealing element thereby form a tight connection between pot and cover.

Conventional ovens generally have hot plates with different diameters; in particular with a diameter of 14.5 cm, 18 cm and/or 21 cm. Accordingly, most of the pots have a top diameter of between 14 cm to 25 cm, depending on their overall shape. According to a preferred embodiment, the cover has a diameter of about 25 cm. The first annular sealing element has an outer diameter of approximately 25 cm and an inner diameter between 10 cm and 20 cm. Therefore the cover can be used with pots of different sizes, especially with pots with a top diameter between 14 cm to 25 cm. According to another embodiment, the cover has a diameter of approximately 29 cm, wherein the first annular sealing element has an inner diameter of 17 cm and an outer diameter of about 28.5 cm has, so that the cover can be used with pots having a top diameter of between 18 cm to 28 cm.

The inventive cover is thus characterized in that it can be used universally. The use is not restricted to a certain pot size nor limited to a particular pot shape. Therefore also pots can be used, which have no cylindrical shape, but are for example designed pot-bellied at the bottom etc. A further advantage of this cover arrives from the fact that the desired pressure conditions can be achieved without any special means provided at the pot. The locking means provided by the cover are sufficient to produce a form-locking and force-locking connection between the cover and the pot.

DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 1 shows various quick-cooking pots and covers according to the known prior art.

FIG. 3 shows the locking mechanism.

FIG. 5 shows the locking means of an embodiment of a cover according to FIG. 4.

FIG. 5 shows another embodiment of the locking mechanism.

FIG. 8 shows the operational mode of a locking mechanism according to FIG. 6.

For the same or equivalent elements of the invention, identical reference numbers are used. Furthermore, for the sake of clarity in the different figures only the reference numbers are presented which are necessary for the description of each figure. The illustrated embodiments are merely examples of how the inventive device or method of the invention can be designed and do not represent any limitation to the scope of the invention.

Figure 2:
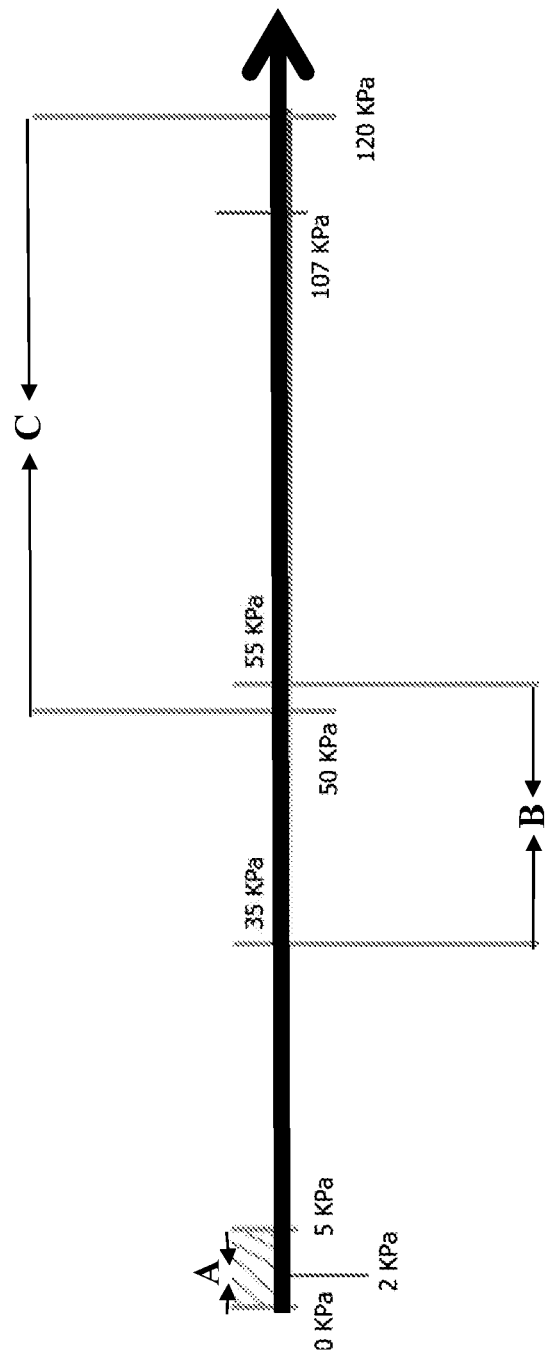
FIG. 2 shows the temperatures and pressure conditions used in cooking.

FIG. 1 and FIG. 2 show the prior art and have already been described.

Figure 6C:
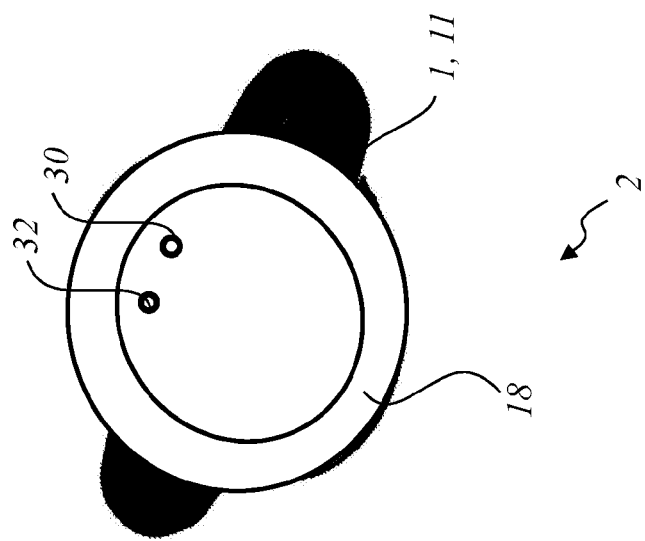
FIG. 6 shows various views of another embodiment of a universal cover with locking mechanism.

FIG. 3 shows the operational mode of a first embodiment of the locking mechanism 10a. The locking mechanism 10a is arranged in the two lateral handles 1 of the cover 2a. The two handles 1 are arranged opposite each other on the cover 2. The two locking means 10a are each arranged in a housing 11. The two housings 11 simultaneously form the two lateral handles 1. The housing 11 is preferably made of two molded parts 11a and 11b (see FIG. 6A). In order to visualize the locking means 10a, one of the molded housing parts 11 is not shown in FIGS. 3B to 3E.

The locking means 10a comprises a contour portion 12 which shows, at least partially, an almost teardrop-shaped contour. The contour portion 12 is mounted pivotally on an actuating element 24, a sliding element 14 with a sealing element 16 and a restoring spring 18.

The actuation of the actuating element 24, in particular the movement of an actuating lever 24a in a movement direction V, causes a rotation R. Thereby the contour portion 12 is rotated about a pivotal attachment point 25. The attachment 25 and thereby the pivot point is arranged on the contour portion 12 at a peripheral position. In the depicted embodiment the rotation of the contour portion 12 is counter-clockwise. In an initial state the sliding element 14 is positively disposed at or form-lockingly arranged on the contour portion 12. The rotation axis of the contour portion 12 is preferably located peripherally. During rotation R of the contour portion 12 (FIG. 3B), the sliding element 14 is moved toward the center D of the cover 2 due to the special shape of the contour portion 12 (FIG. 3C).

A toothed rack 20 is attached to the sliding element 14. The toothed rack 20 is connected to a pinion rod 22 by a snap-lock connection. Meanwhile the sliding element 14 is moved towards the center D of the cover 2, each position is interlocked by the connection of the pinion rod 22 with the toothed rack 20. Thereby an undesired returning movement of the sliding element 14 is reliably prevented. When the sliding element 14 reaches the outer surface of the pot 5 or the pot edge, a further forward movement is blocked. A returning movement is hindered by the interlocking of the pinion rod 22 with the toothed rack 20. The cover 2 is now tightly locked to the pot 5.

The actuating lever 24a and the contour portion 12 automatically return to their respective initial position when the actuating lever 24a is released (FIG. 3C).

FIG. 3D and FIG. 3E show the situations according to FIG. 3B and FIG. 3C, whereby the contour portion 12 is omitted. Therefore the positions taken by the sliding element 14 are more easily visible.

To unlock the cover 2 and remove it from the pot 5, the interlocking connection between the toothed rack 20 and the pinion rod 22 has to be unlatched by unlocking the pinion rod 22. The sliding element 14 is provided with a restoring spring 18. The restoring force of this restoring spring 18 leads to a return movement of the sliding element 14 into its initial position according to FIG. 3A and FIG. 3D.

Figure 7B:
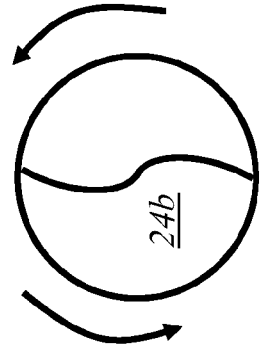
FIG. 7 shows the actuating means of a cover one according to FIG. 6.
Figure 7A:
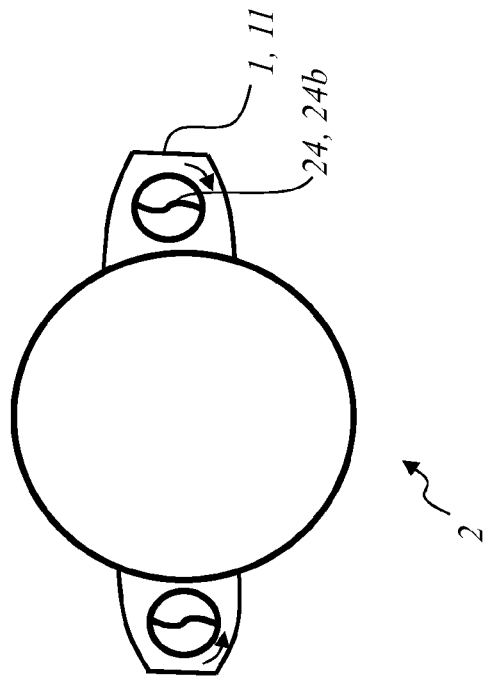

The locking mechanism 10a or the so called adjustment device comprises a sliding element 14 with sealing element 16. The sliding element 14 can be moved towards and away from the middle D of the cover 2 by a shifting movement (see FIGS. 4, 6, 7). The adjustment device or the locking means 10a can be adjusted by an actuating lever 24a, so that the sealing element 16 rests on an upper area of the outer mantle surface of the pot 5. Thereby—in connection with the annular elastic sealing element 26 on the bottom side of the cover 2 (see FIGS. 4C, 4D, 6C)—a form-locking and force-locking connection between the cover 2 and the pot 5 is formed (see FIGS. 4, 6, 7).

Figure 4C:
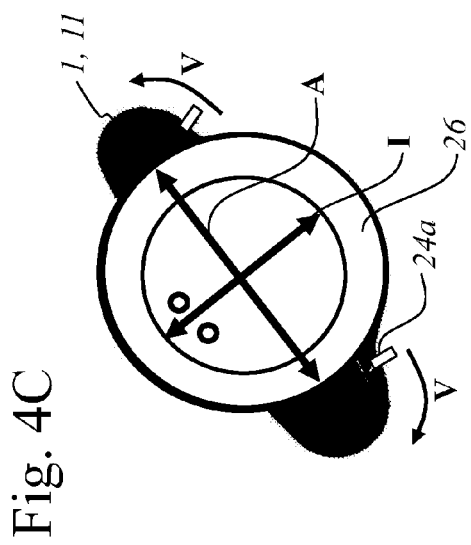
FIG. 4 shows several views of a universal cover with a locking mechanism.
Figure 4D:
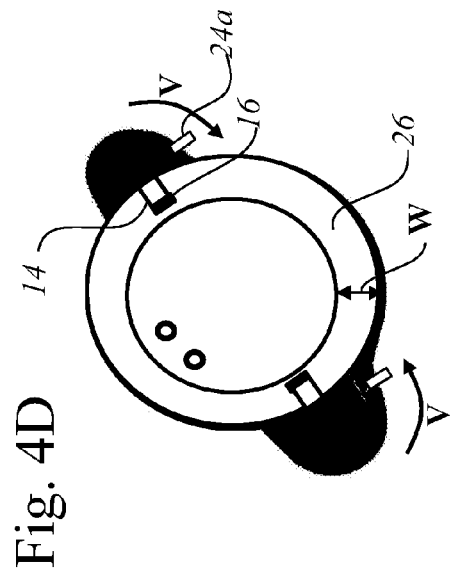

FIG. 4 shows different views of a universal cover 2 with the described locking mechanism 10a. FIG. 4A shows a side view of the cover 2, FIG. 4B shows a cover 2 as seen from above and FIGS. 4C and 4D show a cover 2 as seen from below.

In addition to the two laterally arranged handles 1 the cover 2 is provided with a top-mounted handle 3. Furthermore the cover 2 is provided with a safety valve 30 and a valve 32 for releasing the pressure during cooking.

In the embodiment according to FIG. 4 an actuating means 24 is shown which has the shape of a locking bar 24a. When the locking bar 24a is moved away from the center of the cover 2, a rotation of the contour portion (not shown) is triggered, as has been described in relation with FIG. 3. Thereby the movement of the sliding element 14 in the direction of the center D of the cover 2 is triggered (FIG. 4D). The two locking means 10b are especially arranged in the handles 1 in mirror symmetry, so that they can be operated by the user intuitively and especially simultaneously.

The cover 2 furthermore comprises a wide, elastic, annular sealing element 26 arranged at its bottom side. The cover 2 has for example a diameter of about 24 cm to 26 cm. The annular sealing element 26 has an inner diameter I of about 15 cm to 20 cm and an outer diameter A of about 24 cm to 26 cm. In this case the sliding element 14 must to be able to cover a distance W of about 8 cm to 11 cm.

The cover 2 is put on a pot 5 with an upper diameter between approximately 15 cm to 26 cm. The sliding element 14 is pushed towards the center of the cover 2 by a shifting movement of the locking bar 24a. The sliding element 14 is pushed until the sealing element 16 rests against the outer surface of the pot 5, thereby clamping the pot 5. A form-locking and force-locking connection between the pot 5 and the cover 2 is formed by the elastic sealing elements 16 on the sliding element 14 and the annular sealing element 26 on the bottom side of the cover 2. The locking bar 24a automatically returns to its initial position. A returning movement of the sliding element 14 is blocked by the engagement of the toothed rack with the pinion rod (not shown).

The cover 2 is adjustable to a variety of commercially available pots with a top diameter of approximately 15 cm to 26 cm. The invention is not limited to the cover 2 with the described size. The use of larger or smaller covers 2 with an accordingly sized annular sealing element 26 and at least one respective sliding element 14 is also included in the scope of the invention. The cover 2 according to the invention can be used universally. Its use is not restricted to a certain pot size or a certain pot shape. The size of the pot 5 is only restricted by the size of the annular sealing element 26 at the bottom side of the cover 2, especially by its inner diameter I and outer diameter A. A form-locking and force-locking connection between a cover 2 according to the invention and (almost) any pot 5 can be established. Therefore the combination from pot 5 and cover 2 can be used as pressure cooker with a slight overpressure.

FIG. 5 again shows the locking means 10a of an embodiment of the cover 2 according to FIG. 4. It furthermore shows the individual components like contour portion 12, sliding element 14 with sealing element 16, toothed rack 20 and pinion rod 22, as well as the arrangement of the individual components in a housing part 11a. FIG. 5 especially illustrates the peripheral attachment 25 of the locking bar 24a at the contour portion 12. Therefore an actuation of the locking bar 24a leads to a movement of the contour portion 12 and therefore to a movement of the sliding element 14. This has already been described in regard with FIG. 3.

FIG. 6 shows several views of a universal-cover 2 with another type of locking mechanism 10b. In this embodiment the cover 2 comprises a rotary knob 24b instead of locking bar. Rotation of this rotary knob 24b (see FIG. 7) leads to a rotational movement of the contour portion 12 and therefore to a movement of the sliding element 14, which is directed towards the center of the cover 2 (FIG. 8C). For further details please refer to the description of FIGS. 3 and 4.

Analogous to FIG. 3, FIG. 8 shows the operational mode of a locking mechanism 10b with rotary knob 24b as actuating element 24. In particular, in this embodiment, a releasing means 23 is provided for releasing the engagement between the toothed rack 20 and the pinion rod 22. FIG. 8F again shows a different view of the locking means 10b in the initial state according to FIGS. 8B and 8D.

Figure 9:
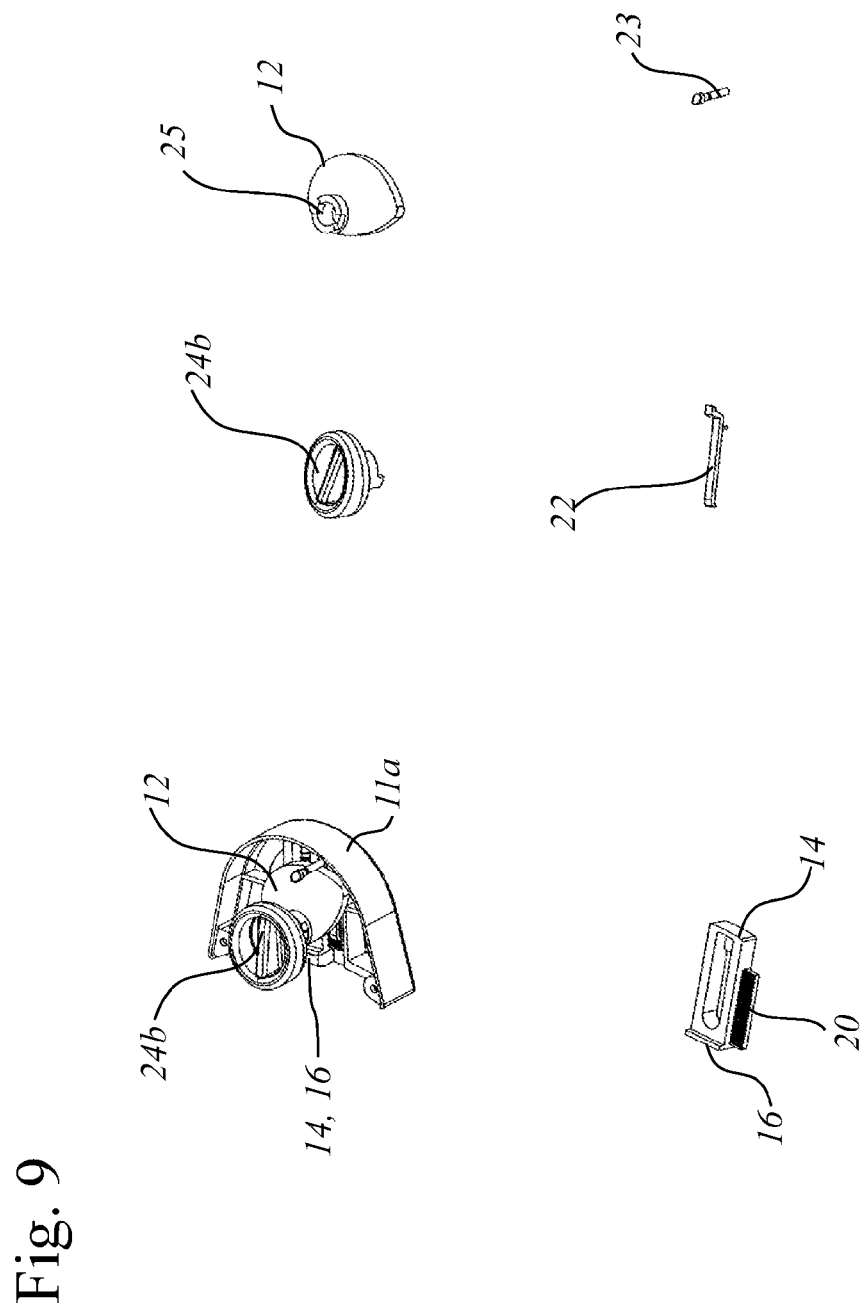
FIG. 9 shows the individual components of a locking mechanism according to FIG. 8.

FIG. 9 shows the individual components of a locking mechanism according to FIG. 8 analogous to FIG. 5.

The invention has been described with reference to preferred embodiments. To the expert it is also conceivable, however, to make changes and modifications without leaving the scope of protection of the appended claims.

LIST OF REFERENCE NUMBERS 1 handle
2 cover
5 pot
10a locking mechanism/locking means
10b locking mechanism/locking means
11 housing
11a molded housing part
11b molded housing part
12 contour portion
14 sliding element 16 sealing element
18 restoring spring
20 toothed rack
22 pinion rod
23 releasing means
24 actuating element
24a actuating lever/locking bar
24b rotary knob
25 attachment/attachment point
26 annular sealing element
30 safety valve
32 valve for pressure release
A outer diameter
D center of the cover
I inner diameter
R rotation
V movement direction
W distance

I claim:

1. A cover (2) for a cooking pot (5), whereby the combination of cover (2) and pot (5) is used as a pressure cooker with a slight overpressure, whereby the cover (2) comprises at least one handle (1, 3) and at least one valve (30) for pressure release, with a first annular sealing element (26) being arranged at the bottom side of the cover (2), characterized in that the cover (2) comprises:
at least one locking means (10a, 10b) to adapt to the size of the pot (5), whereby the at least one locking means (10a, 10b) comprises a contour portion (12), an actuating means (24) and an adjustment means (14), with a second sealing element (16), whereby the actuating means (24) and the adjustment means (14) are operatively connected to each other, whereby the second sealing element (16) is slidably movable in and against the center of the cover (2) and whereby a form-locking and force-locking connection between the cover (2) and an upper part of the outer surface of the pot (5) is producible by the second sealing element (16) of the at least one locking means (10a, 10b) and whereby a form-locking and force-locking connection between the cover (2) and the upper edge of the pot (5) is producible by the first annular sealing element (26), and
whereby the contour portion (12) is rotatably mounted on the actuating means (24) via a shaft and whereby the attachment (25) of the shaft is peripherally arranged on the contour portion (12).

2. The cover (2) according to claim 1, whereby the contour portion (12) is in contact with the adjustment means in an initial position.

3. The cover (2) according to claim 2, whereby the actuating means (24) is an actuating bolt (24a) or a rotary knob (24b).

4. The cover (2) according to claim 3, whereby the adjustment means comprises a sliding element (14) with a second sealing element (16), a blocking means and a return element (18).

5. The cover (2) according to claim 4, whereby the return element (18) is a restoring spring.

6. The cover (2) according to claim 5, whereby the restoring spring is a coil spring.

7. The cover (2) according to claim 4, whereby blocking means comprises a toothed rack (20) and a pinion rod (22).

8. The cover (2) according to claim 4, whereby the locking means (10a, 10b) comprises a releasing means (23) for the blocking means.

9. The cover (2) according to claim 8, whereby the locking means (10a, 10b) comprises a pinion rod (22).

10. The cover (2) according to claim 9, whereby two holding elements (1), each comprising a locking means (10a, 10b), are arranged on opposite sides of the cover (2).

11. The cover (2) according to claim 10, whereby the cover (2) has a diameter of about 29 cm and whereby the annular sealing element (26) has an outer diameter (A) of about 28.5 cm and an inner diameter (I) of about 17 cm.

12. A pressure cooker, comprising:
a cooking pot; and
a cover comprising:
at least one handle (1, 3),
at least one valve (30) for pressure release,
a first annular sealing element (26) being arranged at the bottom side of the cover (2),
at least one locking means (10a, 10b) to adapt to the size of the cooking pot (5),
whereby the at least one locking means (10a, 10b) comprises a contour portion (12), an actuating means (24) and an adjustment means (14), with a second sealing element (16),
whereby the actuating means (24) and the adjustment means (14) that are operatively connected to each other,
whereby the second sealing element (16) is slidably movable in and against the center of the cover (2),
whereby a form-locking and force-locking connection between the cover (2) and an upper part of the outer surface of the cooking pot (5) is producible by the second sealing element (16) of the at least one locking means (10a, 10b),
whereby a form-locking and force-locking connection between the cover (2) and the upper edge of the cooking pot (5) is producible by the first annular sealing element (26), and
whereby the contour portion (12) is rotatably mounted on the actuating means (24) via a shaft and whereby the attachment (25) of the shaft is peripherally arranged on the contour portion (12).

13. A cover (2) for a cooking pot (5), whereby the combination of cover (2) and pot (5) is used as a pressure cooker with a slight overpressure, whereby the cover (2) comprises at least one handle (1, 3) and at least one valve (30) for pressure release, with a first annular sealing element (26) being arranged at the bottom side of the cover (2), characterized in that the cover (2) comprises:
at least one locking means (10a, 10b) to adapt to the size of the pot (5), whereby the at least one locking means (10a, 10b) comprises a contour portion (12), an actuating means (24) and an adjustment means (14), with a second sealing element (16), whereby the actuating means (24) and the adjustment means (14) are operatively connected to each other, whereby the second sealing element (16) is slidably movable in and against the center of the cover (2) and whereby a form-locking and force-locking connection between the cover (2) and an upper part of the outer surface of the pot (5) is producible by the second sealing element (16) of the at least one locking means (10a, 10b) and whereby a form-locking and force-locking connection between the cover (2) and the upper edge of the pot (5) is producible by the first annular sealing element (26),
whereby the contour portion (12) is rotatably mounted on the actuating means (24) via a shaft and whereby the attachment (25) of the shaft is peripherally arranged on the contour portion (12), and whereby the contour portion (12) is in contact with the adjustment means (14) in an initial position.

\* \* \* \* \*